Figure 1:
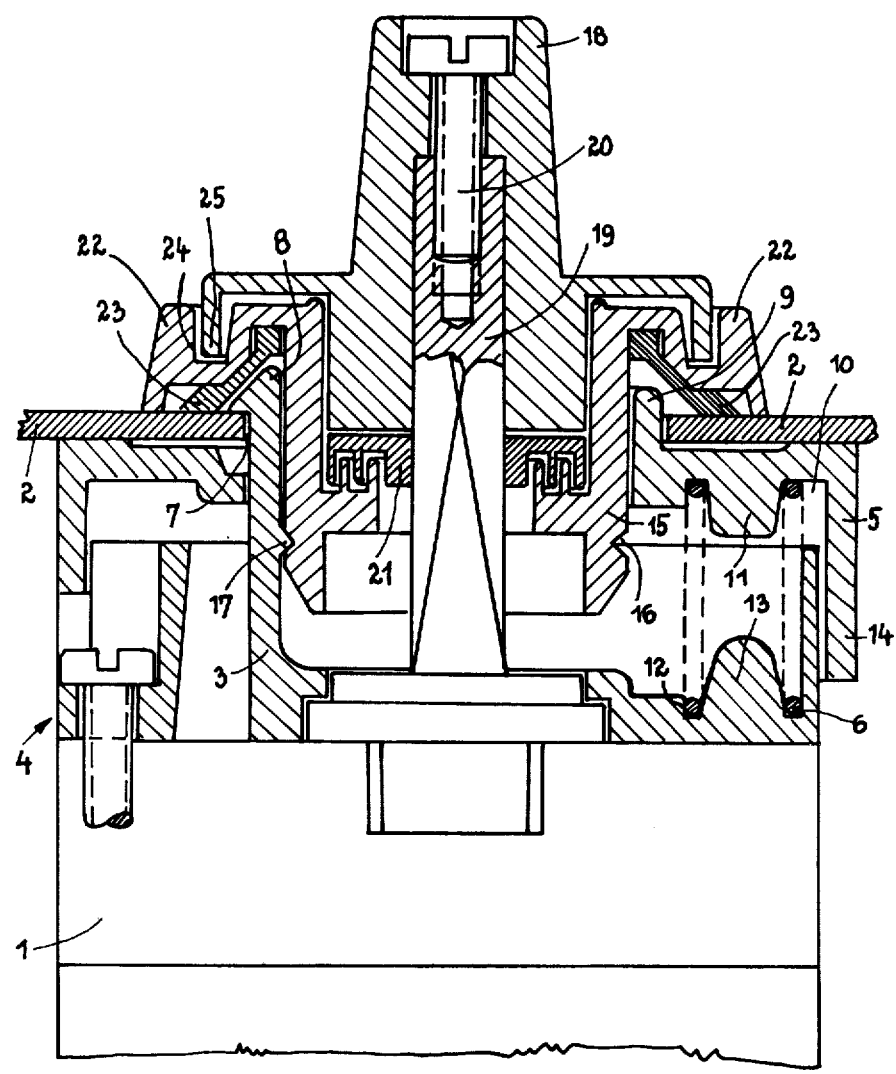

United States Patent [19]

Alsch

[11] 4,208,558
[45] Jun. 17, 1980

[54] SWITCH BOARD MOUNT

[75] Inventor: Gottfried Alsch, Vienna, Austria

[73] Assignee: Hubert Laurenz Naimer, Vienna, Austria

[21] Appl. No.: 922,841

[22] Filed: Jul. 7, 1978

[30] Foreign Application Priority Data

Jul. 7, 1977 [AT] Austria .............................. 4895/77

[51] Int. Cl.² ............................................ H01H 9/00
[52] U.S. Cl. .................................. 200/296; 200/302; 248/27.3
[58] Field of Search ................. 200/295, 296, 302; 248/27.1, 27.3

[56] References Cited

U.S. PATENT DOCUMENTS

| | | | |
|---|---|---|---|
| 2,558,852 | 7/1951 | Jacobi | 248/27.3 |
| 2,874,252 | 2/1959 | Daily et al. | 248/27.3 X |
| 3,553,967 | 1/1971 | Porter et al. | 248/27.3 X |
| 3,674,970 | 7/1972 | Bedocs | 200/295 |
| 3,708,640 | 1/1973 | Fuller | 200/296 X |
| 3,971,908 | 7/1976 | Piber | 200/296 |

*Primary Examiner*—Stephen Marcus
*Attorney, Agent, or Firm*—Kurt Kelman

[57] ABSTRACT

An apparatus for mounting an electrical switch in a cut-out of a switch board comprises a support ring between the switch body and the rear side of the switch board, the support ring surrounding the axially extending switch grip and having claws arranged for engagement with the cut-out at the front side of the switch board. An axially biased housing is mounted between the support ring and the rear side of the switch board, with springs pressing a circumferential portion of the housing against the rear side of the switch board. A coupling ring between the support ring and the switch grip has a radially outwardly directed groove in engagement with a radially inwardly directed rib on the support ring whereby the coupling ring is held against axial movement by the support ring.

11 Claims, 2 Drawing Figures

SWITCH BOARD MOUNT

The present invention relates to an apparatus for mounting an electrical switch element, particularly a switch having an axially extending grip portion and a body, in a cut-out of a switch board having a front side and a rear side. The switch grip passes through the cut-out for operation of the switch body which is spaced from the rear side of the switch board.

Electrical switch elements whose body is hidden by a switch board and whose operating portion projects therefrom usually require two persons for mounting on the switch board, one person holding the switch body behind the switch board and the other person affixing the switch to the front side of the switch board. Various types of mountings have been proposed for this purpose, including claw elements inserted from behind through the cut-out of the switch board and gripping the front side of the switch board along the periphery of the cut-out. This mounting requires cam means for moving the claw elements into engagement with the periphery of the cut-out, i.e. an additional structural element, in addition to a special tool for operating the cam means.

It is the primary object of this invention to overcome this disadvantage and to provide a claw mounting for a switch in a switch board cut-out requiring no special tools.

This and other objects are accomplished in accordance with the invention with a switch mounting apparatus which comprises a support ring between the switch element body and the rear side of the switch board, the support rings surrounding the axially extending switch element portion and claw elements on the support ring arranged for engagement with the cut-out at the front side of the switch board. An axially biased housing is mounted between the support ring and the rear side of the switch board and spring means between the support ring and the housing presses a circumferential portion of the housing at least partially against the rear side of the switch board. A coupling ring is inserted between the support ring and the axially extending switch element portion, the coupling and support rings having radially extending, interengaging rib-and-groove means whereby the coupling ring is held against axial movement by the support ring.

No special tool is needed and this mounting may be affixed by one person because the claw elements holding the switch element in the cut-out are automatically pressed into operating engagement with the front side of the switch board by the axially biased housing in the rear of the switch board. Furthermore, the coupling ring inserted from the front side of the switch board is snapped into position by engagement of the rib and groove.

Figure 2:
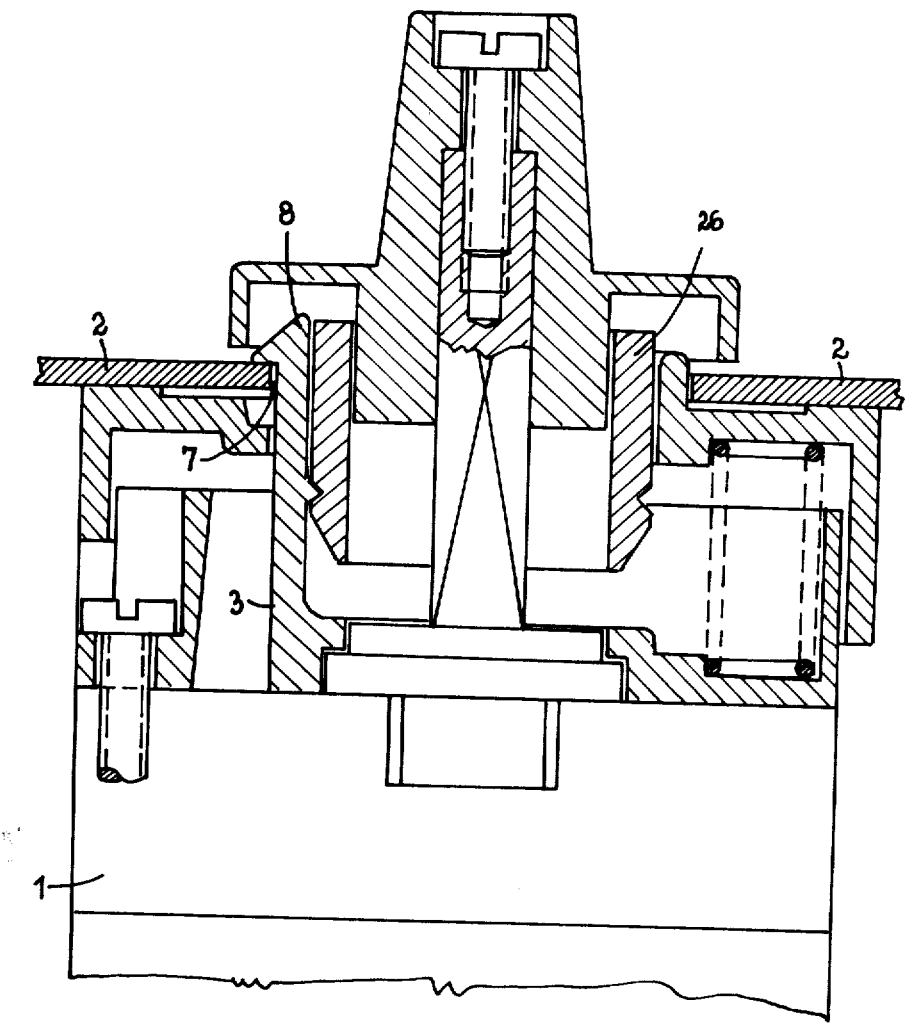

The above and other objects, advantages and features of the present invention will become more apparent from the following detailed description of two now preferred embodiments thereof, taken in conjunction with the accompanying drawing wherein FIG. 1 is an axial section showing one embodiment of this invention and FIG. 2 is a like view showing another emodiment thereof.

Referring now to the drawing, wherein like references numerals designate like parts operating in a like manner in both figures, FIG. 1 shows an apparatus for mounting an electrical switch element, for instance a rotary switch, in cut-out 7 of switch board 2, the switch element having axially extending grip portion 18 passing through the cut-out and body 1 spaced from the rear side of the switch board. The illustrated apparatus comprises support ring 3 between switch element body 1 and the rear side of switch board 2 the supporting ring surrounding the axially extending switch element grip portion and being coaxial therewith. Claw elements 8 e.g. three elements spaced in an annulus project from support ring 3 through cut-out 7 and are arranged for engagement with the cut-out at the front side of the switch board. In the section view of FIGS. 1 and 2 only one claw element is shown. As generally indicated at 4, support ring 3 is affixed to switch element body 1 in any suitable manner, the illustrated connection between support ring 3 and switch element body 1 being provided by screws.

Axially biased cylindrical housing 5 having lateral cut-outs is mounted between support ring 3 and the rear side of switch board 2, spring means 6 between the support ring and the housing pressing a circumferential portion of housing 5 at least partially against the rear side of the switch board. In a preferred embodiment, the spring means comprises one or more coil springs extending parallel to the axis of the switch element, and housing 5 and support ring 3 have bosses 11 and 13 defining aligned recesses 10 and 12, respectively, receiving respective ends of each coil spring.

For assembly, support ring 3 connected to switch element body 1 and housing 5 resiliently carried by the support ring are placed into position from behind the switch board by passing the claw elements througt cut-out 7, the axially biased housing causing the claw elements to engage the front side of the switch board and holding the switch in centered position in cut-out 7 since the claws of elements 8 prevent the switch element from moving axially rearwardly. To prevent any radial movement, housing 5 has projections or keys 9 extending through cut-out 7 alternatingly with claw elements 8. As shown, the housing has cylindrical wall portion 14 partially or fully surrounding support ring 3 and coaxial therewith. To complete the assembly and hold the switch in position on the switch board, coupling ring 15 is inserted axially from the front side of switch board 2 between support ring 3 and axially extending switch element portion 18. The coupling and support rings have radially extending, interengaging rib-and-groove means that will provide a snap engagement upon inward axial movement of the coupling ring, the illustrated snap engagement means being contituted by radially inwardly directed rib 17 on support ring 3 and radially outwardly directed groove 16 in coupling ring 15. The cylindrical wall of coupling ring 15 is somewhat resilient so that it will yield sufficiently, upon axial movement, to permit snap engagement between rib and groove.

Axially extending switch element portion 18 is comprised in the illustrated embodiments of stub axle 19 projecting from switch element body 1 and a switch grip affixed to the stub axle by screw 20. In the embodiment of FIG. 1, labyrinth packing 21 is inserted before the switch grip is screwed to the stub axle so that the packing will be positioned between switch portion 18 and coupling ring 15, packing 21 coaxially surrounding stub axle 19.

The embodiment of FIG. 1 provides a further seal constituted by shielding member 22 projecting from coupling ring 15 beyond and covering claw elements 8, and sealing ring 23 arranged between the front side of switch board 2 and shielding member 22. The illustrated shielding member has a radially extending first portion defining an annular space of substantially square cross section with claw elements 8 and an axially extending second portion engaging the front side of switch board 2. The second shielding member portion has an obliquely extending face spaced from a similarly obliquely extending face of claw elements 8, and sealing ring 23 is frusto-conical and has a first portion of substantially square cross section and substantially filling the annular space, and a second portion extending between the obliquely extending face into engagement with the front side of the switch board.

Shielding member 22 defines annular groove 24 in the illustrated embodiment, which concentrically surrounds axially extending switch element portion 18 and the switch element portion has a flanged disc element extending over shielding member 22. The disc element has flange 25 engaging groove 24.

In substance, the embodiment of FIG. 2 differs from that of FIG. 1 by eliminating the sealing means. In this embodiment, coupling ring 26, which otherwise has the same structure and serves the same function as coupling ring 15, has an outer end flush with claw elements 8. The structure and assembly of both embodiments of the switch mounting are otherwise the same.

What is claimed is:

1. An apparatus for mounting an electrical switch element in a cut-out of an switch board having a front side and a rear side, the switch element having an axially extending portion passing through the cut-out and a body spaced from the rear side of the switch board, which comprises
   (a) a support ring between the switch element body and the rear side of the switch board, the support ring surrounding the axially extending switch element portion and
      (1) claw elements on the support ring arranged for engagement with the cut-out at the front side of the switch board,
   (b) an axially biased housing mounted between the support ring and the rear side of the switch board,
   (c) spring means between the support ring and the housing for pressing a circumferential portion of the housing at least partially against the rear side of the switch board, and
   (d) a coupling ring inserted between the support ring and the axially extending switch element portion,
      (1) the coupling and support rings having radially extending, interengaging rib-and-groove means whereby the coupling ring is held against axial movement by the support ring.

2. The apparatus of claim 1, wherein the rib-and-groove means comprises and radially inwardly directed rib on the support ring and a radially outwardly directed groove in the coupling ring.

3. The apparatus of claim 1, wherein the coupling ring has an outer end substantially flush with the claw elements.

4. The apparatus of claim 1, wherein the coupling ring comprises a shielding member projecting beyond and covering the claw elements, and further comprising a sealing ring arranged between the front side of the switch board and the shielding member.

5. The apparatus of claim 4, wherein the shielding member has a radially extending first portion defining an annular space of substantially square cross section with the claw elements and an axially extending second portion engaging the front side of the switch board and having an obliquely extending face spaced from a similarly obliquely extending face of the claw elements, and the sealing ring is frusto-conical and has a first portion of substantially square cross section and substantially filling the annular space, and a second portion extending between the obliquely extending faces into engagement with the front side of the switch board.

6. The apparatus of claim 4 or 5, wherein the shielding member defines an annualr groove surrounding the axially extending switch element portion and the switch element portion has a flanged disc element extending over the shielding member, the disc element having a flange engaging the groove.

7. The apparatus of claim 1, wherein the housing has projections extending through the cut-out alternatingly with the claw elements.

8. The apparatus of claim 1, further comprising a labyrinth packing between the axially extending switch element portion and the coupling ring.

9. The apparatus of claim 1, wherein the housing has a cylindrical wall portion surrounding the support ring.

10. The apparatus of claim 1, wherein the spring means comprises at least one coil spring extending parallel to the axis of the switch element, and the housing and support ring define alinged recesses receiving respective ends of each of the coil springs.

11. The apparatus of claim 1, wherein the coupling ring engages the support ring and the housing in the region of the cut-out.

* * * * *